United States Patent [19]
Smith

[11] Patent Number: 5,548,439
[45] Date of Patent: Aug. 20, 1996

[54] THREE FIELD OF VIEW REFRACTIVE INFRARED TELESCOPE WITH FIXED MEDIUM FILED OF VIEW

[75] Inventor: Richard R. Smith, Los Angeles, Calif.

[73] Assignee: Hughes Aircraft Company, Los Angeles, Calif.

[21] Appl. No.: 363,846

[22] Filed: Dec. 27, 1994

[51] Int. Cl.⁶ .............................. G02B 5/30; G02B 23/00
[52] U.S. Cl. .................. 359/353; 359/355; 359/399; 359/421; 359/566
[58] Field of Search .................................. 359/353, 354, 359/355, 356, 357, 565, 566, 569, 399, 400, 421, 422, 432

[56] References Cited

U.S. PATENT DOCUMENTS

| | | | |
|---|---|---|---|
| 4,411,488 | 10/1983 | Neil | 359/354 |
| 4,469,396 | 9/1984 | Neil | 359/357 |
| 4,486,069 | 12/1984 | Neil et al. | 359/353 |
| 4,989,962 | 2/1991 | Kebo | 359/354 |
| 5,022,724 | 6/1991 | Shechterman | 359/354 |
| 5,044,706 | 9/1991 | Chen | 359/356 |
| 5,148,314 | 9/1992 | Chen | 359/565 |
| 5,151,820 | 9/1992 | Sillitto et al. | 359/354 |
| 5,151,823 | 9/1992 | Chen | 359/566 |
| 5,202,792 | 4/1993 | Rollin | 359/357 |
| 5,229,880 | 7/1993 | Spencer et al. | 359/353 |
| 5,257,133 | 10/1993 | Chen | 359/566 |

*Primary Examiner*—Paul M. Dzierzynski
*Assistant Examiner*—Darren E. Schuberg
*Attorney, Agent, or Firm*—Michael W. Sales; Wanda K. Denson-Low

[57] ABSTRACT

An infrared refractive reimaging afocal telescope (10) has an objective lens group (12), an eyepiece lens (14), and a switching lens group (16). The system (10) provides a plurality of magnification modes in a compact arrangement. Diffractive surfaces are provided on at least one of the objective lenses and the eyepiece lens. Also, the system (10) utilizes switching lenses (40, 42, 44, 46) to provide magnification changes. The diffractive surfaces provide chromatic aberration correction. The system provides for excellent image quality in all modes using a minimum number of lens elements.

13 Claims, 1 Drawing Sheet

THREE FIELD OF VIEW REFRACTIVE INFRARED TELESCOPE WITH FIXED MEDIUM FILED OF VIEW

BACKGROUND OF THE INVENTION

1. Field of the Invention

The present invention relates to afocal telescopes and, more particularly, to a three field of view reimaging long wave infrared telescope with a fixed medium field of view.

2. Description of Related Art

When viewing a distant object through a telescope system, the observer is commonly interested in performing several separate functions. One of these functions may be a coarse search over a large field of view for the purpose of locating or acquiring previously undetected objects. Another function may be the fine examination over a smaller field of view for purposes of identification, tracking, or discrimination of previously located objects. Still a third such function may provide a very wide field of view for purposes of pilotage, navigation, or driving. Combining these three functions in a scanning forward looking infrared (FLIR) system usually requires three different afocal magnification telescopes employed in front of a common scanner, imager, and detector/dewar assembly.

In applications requiring high resolution (e.g. for target identification and tracking), a high magnification afocal telescope is desirable. This is due to the large entrance aperture required to reduce diffraction effects in the infrared bands, where such effects contribute significantly to the optical blur, to a sufficiently low level to allow observation of target details. For applications requiring very wide fields of view (e.g. for pilotage or navigation), a magnification near or less than unity is desirable. Also, it is advantageous and desirable, when the ratio between the high and low magnification is very large to provide a third afocal magnification between the two extremes to bridge the gap and make target acquisition, observation, and hand-off between the high and low magnifications less taxing to either a human observer or an automated sensing algorithm.

Prior refractive telescope systems have been utilized in whole or part. These refractive optical systems generally have one or more of the following disadvantages:

a) they may allow only two of the three magnification/field of view modes described above;

b) they often do not allow a sufficiently high magnification in the narrow field of view mode;

c) they are often of undesirably large size;

d) they are composed of a prohibitively large number of optical lens elements, such that the overall transmission is significantly lowered;

e) there is an incomplete correction of optical aberrations, most notably chromatic aberrations;

f) the multiple fields of view are not co-axial and cannot pass through a common external port or window;

g) they may leave unacceptably high narcissus levels whereby the detector can view itself by means of reflections from lens surfaces.

One such device which has overcome these disadvantages is illustrated in U.S. Pat. No. 5,229,880, entitled "Three Field Of View Refractive Afocal Telescope" to Spencer et al, assigned to the same Assignee as the present invention, the specification and drawings of which are herein expressly incorporated by reference. In this system, a refractive afocal telescope optical system provides an improved aberration correction utilizing a minimum number of optical lenses. The system also provides three coaxial fields of view in the thermal infrared band. The system enables packaging within a relatively small diameter spherical volume which leaves sufficient room for other required system elements. Also, it provides afocal magnification greater than those previously available in the art.

While this system works satisfactorily for its intended purpose, like other prior art systems, it is a fixed speed telescope, that is, all fields of view operate at the same F number. Thus, the narrow field of view entrance pupil is larger than the medium field of view pupil, and a larger diameter objective lens is required. Also, the entrance pupil location shifts from narrow field of view to medium field of view to wide field of view. While these disadvantages are minor, those skilled in the art continue to work to improve performance.

SUMMARY OF THE INVENTION

Accordingly, the new and improved refractive afocal telescope optical system of the present invention provides the art with improved aberration correction, improved narcissus and element reduction utilizing a minimum number of optical lens elements. The present invention provides three coaxial fields of view in the long wave infrared band. The present invention further provides a system which has an entrance pupil which has the same size and location for the narrow field of view and medium field of view. While the narrow field of view of the system operates at a slower speed than the medium field of view, it allows for a more compact package. Also, the optical elements in the medium field of view are fixed to minimize the narcissus in all fields of view and to reduce the complexity of the mechanical design. Additionally, both the narrow and medium field entrance pupils are located on the objective lens to reduce size growth due to beam wander.

In the preferred embodiment of the invention, the infrared refractive reimaging afocal telescopic system includes an objective lens group containing an entrance pupil to receive and focus radiation of a viewed object. At least one optical element of the objective lens group has an optical diffractive surface to correct chromatic aberration. An eyepiece lens group receives radiation from the objective lens group and recollimates the radiation and forms an exit pupil. A switching lens group, which is selectively positioned into and out of the radiation beam with respect to the objective and eyepiece lens groups, receives energy to change the magnification and field of view of the telescope.

Generally, the switching lens group includes four lenses grouped in two pairs. A first pair of the lenses is positioned into the radiation beam to receive energy to provide a desired magnification and field of view. A second pair of lenses may also be positioned into the radiation beam, while the first pair is withdrawn from the beam, to receive energy to provide another desired magnification and field of view. Also, when the switching lens group is out of the radiation beam with respect to the objective lens group, the telescope provides a desired magnification and field of view.

From the subsequent description and the appended claims taken in conjunction with the accompanying drawings, other objectives and advantages of the present invention will become apparent to those skilled in the art.

DESCRIPTION OF THE PREFERRED EMBODIMENT

Figure 1:
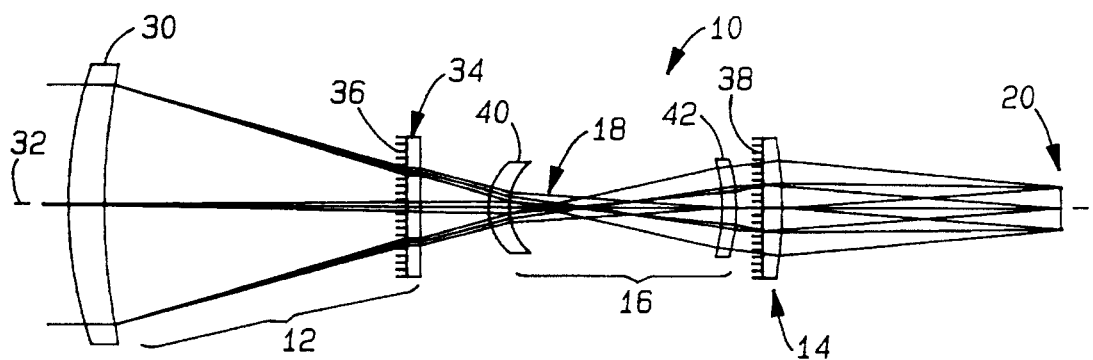
FIG. 1 is a schematic view of the present invention with a first pair of switching lenses in the optical beam to obtain the highest magnification of the telescope.
Figure 2:
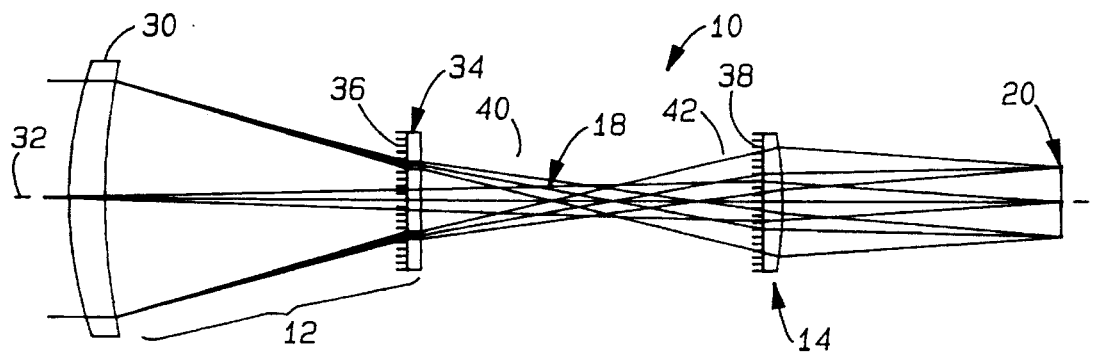
FIG. 2 is a schematic view of the optical system in accordance with the present invention with the switching lens pairs entirely out of the optical beam to obtain an intermediate magnification telescope.
Figure 3:
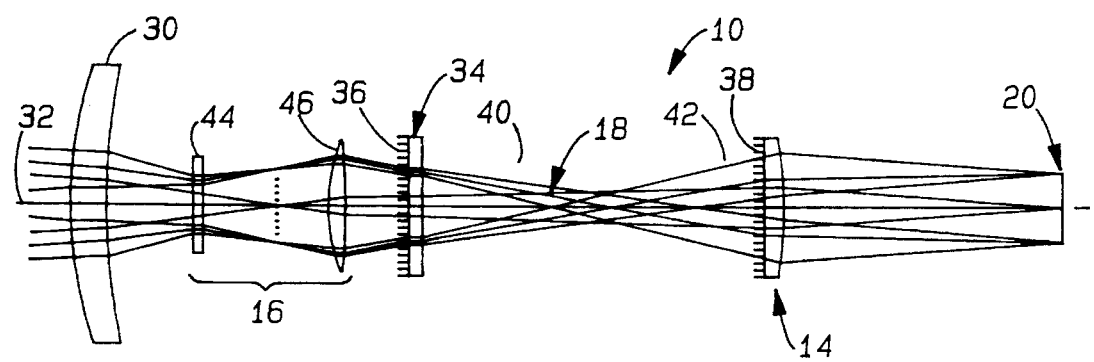
FIG. 3 is a schematic view like that of FIG. 1 with a second pair of switching lenses in the optical beam to obtain the lowest magnification telescope; the first pair of switching lenses have been withdrawn from the optical beam.

Turning to FIGS. 1 through 3, an infrared refractive reimaging afocal telescopic system is illustrated and designated with the reference numeral 10. The system 10 includes an objective lens group 12, an eyepiece lens group 14, and switching lens group 16. The lens groups focus and then recollimate the beam 18 and form an exit pupil at plane 20. Subsequent in the optical path from exit pupil 20, is located the remaining conventional elements 60 of an imaging system 62, including a scanner, imager, and detector/dewar assemblies which are common elements in scanning infrared imaging systems. As shown in FIGS. 1, 2, and 3 the system 10 has an entrance pupil 50 which has the same size and location for the narrow field of view embodiment (FIG. 1) as for the medium field of view embodiment (FIG. 2).

The objective lens group 12 includes two lenses. The lens 30 defines an optical axis 32 and is preferably a positive convex/concave lens. The lens 34, which is positioned on axis, is a negative biconcave lens having a diffractive surface 36 on the left or front concave side, as viewed in the figures. The diffractive surface 36 aids in the correction of chromatic aberration. Both lenses have a predetermined radius of curvature on their front and back surfaces, a predetermined thickness at their vertexes and predetermined aperture sizes on their front and back surfaces. Also, the objective lenses are stationarily positioned with respect to the system 10.

The eyepiece lens 14 is generally a positive concave/convex lens having a diffractive surface 38 on the concave or front surface. The eyepiece lens recollimates the radiation focused by the objective lenses and reimages the entrance pupil to an exit pupil at the exit plane 20. The diffractive surface 38 enables chromatic dispersion in the thermal infrared spectral band to be controlled in such a way as to correct for lateral chromatic aberration inherently present in a simplified eyepiece of this type. This eliminates the cost, size, and weight of a more complex conventional eyepiece design. Also, the eyepiece lens is stationarily positioned with respect to the system 10.

These three fixed lenses define the medium or intermediate field of view. By fixing the medium field of view, the package size is determined by the smaller entrance pupil of the medium field of view and is smaller than those currently available. In fixed speed systems, the narrow field of view entrance pupil, which is typically located on the objective lens, is larger than the medium field of view entrance pupil by the ratio of the magnifications. While in the prior art, the objective lens and package size is driven by the narrow field of view, the present system is driven by the medium field of view entrance which constrains the narrow field of view pupil to be the same size and at the same location as that of the medium field of view entrance pupil. Thus, the narrow field of view speed is slower, but the package is smaller.

Further, by positioning both the medium field of view and narrow field of view entrance pupils on the objective lens, the size growth due to beam wander is reduced. Furthermore, by utilizing the medium field of view as the fixed field of view, acceptable narcissus is present in all fields of view.

The switching lens group 16 is best illustrated in FIGS. 1 and 3. In FIG. 1, a narrow field of view is illustrated. In FIG. 3, a wide field of view is illustrated.

The switching lens group 16 includes four lenses 40, 42, 44 and 46. The lenses 40 and 42, and 44 and 46 act as lens pairs in the narrow and wide field of view magnification modes, respectively. The lens pair 40 and 42 is selectively moved in line with the beam 18 to receive radiation from the negative objective lens 34. The lens 40 is a negative convex/concave lens. Lens 42 is a positive convex/concave lens. Both lenses 40 and 42 are positioned between the negative objective lens 34 and the eyepiece lens 14. The lenses 40 and 42 are positioned on axis and have a predetermined radius of curvature on their front and back surfaces. Also, the lenses 40 and 42 have a predetermined thickness at their vertex and a predetermined aperture size on their front and rear surfaces.

FIG. 3 illustrates a wide field of view magnification mode. In this case, lenses 40 and 42 have been rotated out of the beam 18 of the system. Lenses 44 and 46 are rotated into the beam 18 as seen in FIG. 3. The lens 44 is a negative biconcave lens. The lens 46 is a positive biconvex lens. Both lenses 44 and 46 are positioned between the objective lens 30 and negative objective lens 34. Also, both lenses 44 and 46 are positioned on the optical axis 32. The lenses 44 and 46 have a predetermined radius of curvature on their front and back surfaces. Also, the lenses have a predetermined thickness at their vertex and predetermined aperture sizes on their front and back surfaces.

The diffractive optical surfaces may be binary optical elements which are generally produced through photolithographic processes or they may be true Fresnel phase plates produced by precision diamond machining. Generally, to produce optical power, the binary refractive optical element is in the form of a Fresnel phase plate with stair step approximations of the true desired periodic phase altering projections. Further details about binary optical surfaces may be found in the publications: G. Swanson and W. Veldkamp, "Infrared Applications Of Diffractive Optical Elements", SPIE Proceedings, Volume 885, Paper No. 22, 1988; and D. Shafer and T. McHugh, "Binary Optics Design Surprises For The 1990's", SPIE Conference Proceedings, Orlando Fla., March, 1989.

Also, a diffractive surface may be formed by precision diamond machining. In this type of diffractive surface, the surfaces of the projections are a smoother approximation of the desired Fresnel phase screen, unlike the stair step projections of the photolithographic surfaces.

The switching lenses 44 and 46, in the grouping as described above, have the effect of reducing the focal length of the objective lens group while maintaining its focal plane at the same location as in the medium or intermediate field of view magnification mode as seen in FIG. 2. This allows the field of view of the telescope to become larger as the lens pair is moved into the beam. Thus, the same eyepiece recollimates the radiation without the need for repositioning with each magnification change.

The switching lenses 40 and 42 have the effect of increasing the focal length of the objective and decreasing the focal length of the eyepiece. This allows the field of view of the telescope to become smaller while maintaining the position of the entrance and exit pupils as they are in the medium field of view.

The present invention in FIG. 1 provides for a 6.3× magnification narrow field of view. As the switching lens pair 40 and 42 is moved out of the beam, the magnification is 4.0× with a medium or intermediate field of view. The lens pair 44 and 46 provides a 1.2× magnification wide field of view. The system has a pair of diffractive surfaces on the fixed negative objective lens 34 and positive eyepiece lens 14 in all three fields of view.

A specific prescription for telescopic system configuration is given in the following table.

of view. This is advantageous in that the narrow field of view tolerates more narcissus, since it is a slower system.

This optical system may be provided to fit into current systems to increase the high end magnification capabilities without substantial redesign for packaging purposes. Also, the present invention provides a forward looking infrared telescope in the long wave infrared spectrum which enables three coaxial forward looking infrared fields of view.

While it will be apparent that the preferred embodiment is well calculated to fill the above stated objectives, it will also be appreciated that the present invention is susceptible to modification, variation, alteration, and change without vary-

TABLE 1

| Optical Prescription | | | | | | | | | |
|---|---|---|---|---|---|---|---|---|---|
| Element | | | Thickness & | | Conic | Aspheric | Grating | | Apertures & Obstructions | |
| Number | Designation | Radius R | Air Spaces | Material | Constant K | Coefficients** AD, AE | Coefficient* α, β | Grating Order | Type | Semi-Diameter |
| 30 | Objective I | 6.984 | 0.500 | Ge | — | — | — | — | Aperture | 3.15 |
| | | 10.513 | | | .07178 | AD = +0.16265E-04 | — | — | Aperture | 3.15 |
| 34 | Objective II | −25.321 | 0.200 | Ge | 0 | AD = +0.80572E-03 | α = −6.7489 | 1 | Aperture | 1.165 |
| | | 20.771 | | | — | — | — | — | Aperture | 1.165 |
| 14 | Eyepiece | −14.884 | 0.250 | Ge | 0 | AD = −0.15257E-02 AE = +0.39107E-04 | α = −1.99565 β = −.874756 | 1 | Aperture | 1.730 |
| | | −5.024 | | | — | — | — | — | Aperture | 1.730 |
| 40 | NFOV I | 0.989 | 0.200 | Ge | — | — | — | — | Aperture | 0.700 |
| | | 0.744 | | | −.030395 | — | — | — | Aperture | 0.700 |
| 42 | NFOV II | −3.474 | 0.200 | Ge | — | — | — | — | Aperture | 1.320 |
| | | −3.344 | | | — | — | — | — | Aperture | 1.320 |
| 44 | WFOV I | −9.976 | 0.175 | Ge | — | — | — | — | Aperture | 0.750 |
| | | 8.436 | | | — | — | — | — | Aperture | 0.750 |
| 46 | WFOV II | 4.897 | 0.225 | Ge | −4.6414 | AD = +0.86964E-04 AE = −0.21271E-03 | — | — | Aperture | 1.104 |
| | | −19.459 | | | — | — | — | — | Aperture | 1.104 | where $\rho = \sqrt{x^2 + y^2}$ all measurements are in inches
positive is to the right

*Phase (in waves) $\phi = \alpha\rho^2 + \beta\rho^4$ $$\text{Grating spacing} = \left(\frac{d\phi}{d\rho}\right)^{-1}$$

**Sag $S = \dfrac{\rho^2}{R + \sqrt{R^2 - (k+1)\rho^2}} + AD\rho^4 + AE\rho^6$

It should be noted that the above prescription is an example for illustrative purposes and should not be construed in any way to limit the present invention.

The diffractive surfaces on the negative objective lens and the positive eyepiece lens act to correct axial chromatic aberration and lateral chromatic aberration in all fields of view.

An advantage of the present invention is that the invention enables three magnification ranges in a compact volume with near diffraction limited image quality. Also, the present invention provides a narrow, intermediate and wide field of view without the need to reposition the eyepiece lens of the group. Also, by fixing the medium field of view magnification mode, acceptable narcissus is present in all fields of view. Further, with a fixed medium field of view, only two switch lenses, both between the eyepiece and negative objective lens, are needed to achieve the narrow field of view. Furthermore, with fewer lens surfaces defining a switched narrow field of view, a switched narrow field of view narcissus is lower than that of a switched medium field ing from the proper scope and fair meaning of the subjoined claims.

What is claimed is:

1. A telescope for providing narrow, medium, and wide field of views over an optical path, said telescope comprising:

objective means including at least one optical element including a diffractive optical surface means for correcting chromatic aberration;

eyepiece means for recollimating radiation received from said objective means and forming an exit pupil;

said objective means and eyepiece means providing a first magnification mode; and switch means for providing a plurality of magnification modes of said telescope, and said switch means selectively receiving and transmitting said radiation, said switch means being optically included in said optical path for said narrow and wide fields of view and optically excluded from said optical path for said medium field of view, and said telescope having an entrance pupil at the same location and of the same size for the narrow and medium field of views to minimize the size of said telescope.

2. The telescope according to claim 1 wherein said eyepiece means includes at least one optical element including a diffractive optical surface means for correcting chromatic aberration.

3. The telescope according to claim 1 wherein said switch means includes a plurality of optical elements.

4. The telescope according to claim 1 wherein said diffractive surface means is a diffractive grating.

5. A telescope for providing narrow, medium, and wide field of views, comprising:

an objective lens group for receiving and focusing collimated radiation of a viewed object, at least one optical element of said objective lens group having an optical diffractive surface for correcting chromatic aberration;

an eyepiece lens group receiving radiation from said objective lens group said eyepiece lens group recollimating and forming an exit pupil;

said objective lens group and said eyepiece lens providing a first magnification and a medium field of view;

a switch lens group selectively positionable with respect to said objective lens group to receive and transmit said radiation for changing magnification of the telescope and providing narrow and wide fields of view, said telescope having an entrance pupil at the same location and of the same size for said narrow and medium fields of view to minimize the size of said telescope.

6. The telescope according to claim 5 wherein said eyepiece lens includes a diffractive surface for correcting chromatic aberration.

7. The telescope according to claim 5 wherein said switch lens group includes four lenses grouped in pairs with a first pair of said lenses positioned to receive radiation to provide a desired magnification and field of view and a second pair of lenses positioned to receive energy to provide another desired magnification and field of view.

8. The telescope according to claim 7 wherein said first pair of lenses are positioned within said objective lens group and said second pair of lenses are positioned between said objective lens group and said eyepiece lens.

9. The telescope according to claim 5 wherein said telescope provides three fields of view.

10. A telescope for providing narrow, medium, and wide fields of view comprising:

a pair of objective lenses for receiving and focusing collimated radiation in the thermal infrared band of a viewed object, at least one lens of said objective lens group having a diffractive surface for correcting chromatic aberration;

switching lens group to selectively receive and transmit radiation from at least one of said objective lenses for changing magnification of the telescope and providing said fields of view; and an eyepiece lens for receiving energy from said objective lens pair and for recollimating the radiation and forming an exit pupil, said eyepiece lens including a diffractive surface for correcting chromatic aberration, wherein said telescope has an entrance pupil having the same location and size for the medium and narrow fields of view to minimize the size of said telescope.

11. The telescope according to claim 10 wherein said switching lens group includes four lenses grouped in pairs with a first pair of said lenses positioned between said objective lenses to receive and transmit radiation to provide a desired magnification and wide field of view and a second pair of lenses positioned between said objective lenses and said eyepiece lens to receive and transmit radiation to provide another desired magnification and narrow field of view.

12. The telescope according to claim 11 wherein said switching lens group is positioned to not receive and transmit radiation, said telescope provides a desired magnification and medium field of view.

13. An infrared imaging system for narrow, wide, and medium fields of view comprising:

a telescope for providing said fields of view for an optical path and for receiving an input image at an entrance pupil and providing an output image at an exit pupil; and a scanner, imager, and detector assembly for receiving said output image to provide a scanned infrared image;

said telescope including an objective lens group having at least one optical element with a diffractive surface for correcting chromatic aberration and forming said entrance pupil and an eyepiece lens group for forming said exit pupil, said objective lens group and eyepiece lens group providing a first magnification for said medium field of view;

said telescope further comprising a switch lens group selectively positionable in said optical path for changing magnification and for providing said narrow and wide field of views, wherein said entrance pupil is the same size and the same location for the medium and narrow fields of view to minimize the size of the telescope in said imaging system.

* * * * *